(12) United States Patent
Liao et al.

(10) Patent No.: US 12,473,420 B2
(45) Date of Patent: Nov. 18, 2025

(54) METHOD FOR PROCESSING WASTE FABRIC CONTAINING POLYESTER AND WOOL FIBERS

(71) Applicant: NAN YA PLASTICS CORPORATION, Taipei (TW)

(72) Inventors: Te-Chao Liao, Taipei (TW); Jung-Jen Chuang, Taipei (TW); Chung-Chi Su, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 710 days.

(21) Appl. No.: 17/877,827

(22) Filed: Jul. 29, 2022

(65) Prior Publication Data

US 2023/0132013 A1  Apr. 27, 2023

(30) Foreign Application Priority Data

Oct. 25, 2021 (TW) .................................. 110139422

(51) Int. Cl.
*C08J 11/26* (2006.01)
*D01G 11/00* (2006.01)

(52) U.S. Cl.
CPC ............ *C08J 11/26* (2013.01); *D01G 11/00* (2013.01); *C08J 2367/00* (2013.01); *D10B 2211/02* (2013.01); *D10B 2331/04* (2013.01); *Y02W 30/62* (2015.05)

(58) Field of Classification Search
CPC ....... C08J 11/26; C08J 2367/00; D01G 11/00; D10B 2211/02; D10B 2331/04
See application file for complete search history.

(56) References Cited

U.S. PATENT DOCUMENTS

| 9,932,456 | B2 | 4/2018 | Rangaswamy et al. |
| 2004/0219247 | A1* | 11/2004 | Bacher .................... C08J 11/06 100/35 |
| 2011/0065817 | A1* | 3/2011 | Van Weynbergh ...... C08J 11/02 521/46.5 |
| 2020/0262108 | A1 | 8/2020 | Keh et al. |
| 2022/0049381 | A1 | 2/2022 | Herchl et al. |

FOREIGN PATENT DOCUMENTS

| CN | 106674588 A | 5/2017 |
| CN | 113226579 A | 8/2021 |
| JP | 2000344933 A | 12/2000 |
| JP | 2008222570 A | 9/2008 |
| JP | 201935022 A | 3/2019 |

OTHER PUBLICATIONS

Machine translation of JP 2000344933 by Wada (Year: 2000).*
Machine translation of JP 2019035022 by Ito et al (Year: 2019).*
Machine translation of DE 19534276 by Hasenpusch (Year: 1997).*

* cited by examiner

*Primary Examiner* — Christina H. W. Rosebach
(74) *Attorney, Agent, or Firm* — Li & Cai Intellectual Property (USA) Office

(57) ABSTRACT

A method for processing a waste fabric containing polyester and wool fibers includes the following steps. The method is to treat the waste fabric with an acid catalyst aqueous solution at 160° C. to 170° C. The wool fibers are degraded and completely separated from the polyester fibers in a treatment process. Afterwards, the polyester fibers are recycled.

8 Claims, 4 Drawing Sheets providing a waste fabric containing polyester and wool fibers — S100 treating the waste fabric with an acid catalyst aqueous solution at 160° C to 170° C, such that the wool fibers of the waste fabric are degraded and separated from the polyester fibers — S102 recycling the treated waste fabric — S104

METHOD FOR PROCESSING WASTE FABRIC CONTAINING POLYESTER AND WOOL FIBERS

CROSS-REFERENCE TO RELATED PATENT APPLICATION

This application claims the benefit of priority to Taiwan Patent Application No. 110139422, filed on Oct. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a waste fabric recycling technology, and more particularly to a method for processing a waste fabric based on an acid-catalyzed hydrothermal reaction, which is suitable for processing a waste polyester/wool blend fabric.

BACKGROUND OF THE DISCLOSURE

With the continuous improvement of people's living conditions and level of consumption, the life cycle of textile fabric has been greatly shortened, causing disposal problems resulting from huge quantities of textile waste. Polyester/cotton blend textiles make up a large proportion of the textile waste. Such blend textiles are difficult to recycle, and can easily cause adverse environmental impacts after being discarded. From the perspectives of environmental protection and resource conservation, recycling is the best way to reduce textile waste.

Currently, there are three main ways for recycling textile waste, namely physical recycling, energy recycling and chemical recycling. In a physical recycling process, textile waste can be processed to a state where reuse of the textile is possible. For example, waste from clothing is cut into small pieces to be used as rags, or a carpet with minor damage is repaired and refurbished for reuse. In an energy recycling process, chemical fibers with a higher calorific value in textile waste are incinerated to generate thermal energy for generation of electricity. This is suitable for disposal of textile waste that cannot be recycled. In a chemical recycling process, high molecular polymers in textile waste are depolymerized, and depolymerization products such as monomers are used to manufacture new chemical fibers. In the chemical recycling process, preliminary results have been achieved in the recycling and reuse of some high value chemical polymer materials.

U.S. Pat. No. 9,932,456 discloses sodium hydroxide being used as hydrolyzing agent for degradation of wool fibers in a polyester/wool blend textile, so as to form a keratin solution, in which there is no change in polyester fibers. Accordingly, polyester fibers are separated from wool fibers. Japan Patent Publication No. 2000-344933 discloses a bio-enzyme being used for degradation of wool fibers in a polyester/wool blend textile, in which there is no change in polyester fibers, so that the separation of polyester and wool fibers is achieved.

However, the technical contents mentioned in the above literature use not only substances that are more harmful to the environment, but also solvents that are more expensive, which may cause a greater burden on the environment and higher costs.

SUMMARY OF THE DISCLOSURE

In response to the above-referenced technical inadequacies, the present disclosure provides a method for processing a waste fabric containing polyester and wool fibers, having the advantages of being low in cost and being capable of large-scale processing. The polyester fibers obtained from the waste fabric that is processed can be recycled and reused.

In one aspect, the present disclosure provides a method for processing a waste fabric containing polyester and wool fibers, including: providing a waste fabric containing polyester and wool fibers; treating the waste fabric with an acid catalyst aqueous solution at 160° C. to 170° C., such that the wool fibers of the waste fabric are degraded and separated from the polyester fibers; and recycling the treated waste fabric.

In one embodiment of the present disclosure, the step of providing the waste fabric includes fragmentizing the waste fabric into a plurality of fabric scraps.

In one embodiment of the present disclosure, in the step of treating the waste fabric with the acid catalyst aqueous solution, the fabric scraps are dipped in the acid catalyst aqueous solution to carry out a hydrothermal reaction at 160° C. to 170° C. for 1 hour to 5 hours for the degradation of the wool fibers.

In one embodiment of the present disclosure, in the step of treating the waste fabric with the acid catalyst aqueous solution, the acid catalyst aqueous solution is applied in a circulation and backflow manner to repeatedly contact the fabric scraps and carry out a hydrothermal reaction at 160° C. to 170° C. for 1 hour to 5 hours for the degradation of the wool fibers. A contact frequency of the acid catalyst aqueous solution with the fabric scraps is 3 to 5 times per minute.

In one embodiment of the present disclosure, in the step of treating the waste fabric with the acid catalyst aqueous solution, a solid to liquid ratio of the waste fabric and the acid catalyst aqueous solution is 1:5-100.

In one embodiment of the present disclosure, the solid to liquid ratio of the waste fabric and the acid catalyst aqueous solution is 1:5-10.

In one embodiment of the present disclosure, the acid catalyst aqueous solution includes 0.1 wt % to 1 wt % of at least one acid catalyst.

In one embodiment of the present disclosure, the at least one acid catalyst is an organic acid, an organic acid anhydride, a Lewis acid, or any combination thereof.

In one embodiment of the present disclosure, the organic acid is oxalic acid, the organic acid anhydride is acetic anhydride, and the Lewis acid is zinc chloride.

In one embodiment of the present disclosure, the at least one acid catalyst is the combination of oxalic acid and acetic anhydride, and the oxalic acid and the acetic anhydride are present in a weight ratio of 1-10:1.

In one embodiment of the present disclosure, the method further includes recycling the polyester fibers from the treated waste fabric and forming the recycled polyester fibers into polyester pellets.

Accordingly, the method for processing a waste fabric containing polyester and wool fibers provided by the present disclosure, by virtue of "treating the waste fabric with an acid catalyst aqueous solution at 160° C. to 170° C., such that the wool fibers of the waste fabric are degraded and separated from the polyester fibers," can separate the polyester fibers from the wool fibers and achieve the recycling and reuse of the polyester fibers. Moreover, the entire treatment process of the waste fabric that uses water as a solvent is more environmentally friendly.

Furthermore, the acid catalyst aqueous solution is applied in a circulation and backflow manner to repeatedly contact the waste fabric (or fabric scraps), such that a solid to liquid ratio of a reaction system can be lowered to 1:5-10. Accordingly, an amount of the acid catalyst aqueous solution can be greatly reduced, processing costs can be reduced, and a reaction time can be shortened.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
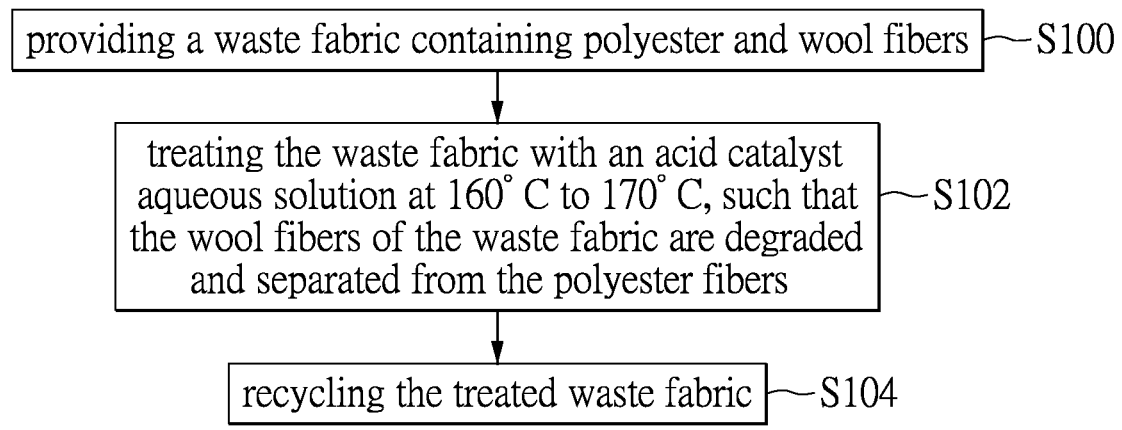
FIG. 1 is a flowchart of a method for processing a waste fabric containing polyester and wool fibers according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

All materials used in the following examples are available from commercial sources unless otherwise specified. All operations or instruments used in the following examples are common operations or instruments in the art unless otherwise specified. All percentages and contents described in the following examples are expressed by weight unless otherwise indicated.

First Embodiment

Referring to FIG. 1, a first embodiment of the present disclosure provides a method for processing a waste fabric containing polyester and wool fibers by an acid-catalyzed hydrothermal reaction, such that degradation products of the wool fibers and the waste fabric only containing the polyester fibers can be obtained. Therefore, the separation, recycling and reuse of polyester and wool fibers can be achieved. As shown in FIG. 1, the method of the present disclosure includes the following specific steps: step S100, providing a waste fabric containing polyester and wool fibers; step S102, treating the waste fabric with an acid catalyst aqueous solution at 160° C. to 170° C., such that the wool fibers of the waste fabric are degraded and separated from the polyester fibers; and step S104, recycling the treated waste fabric. The term "waste fabric" as described herein can refer to discarded or used fabrics such as clothing and bed sheets or wastes generated in textile production processes such as scraps and clothes.

In step S100, the waste fabric can be divided into a plurality of fabric scraps by cutting or tearing, but is not limited thereto. Each of the fabric scraps contains polyester fibers and wool fibers. More specifically, the waste fabric can be a polyester/wool blend fabric, in which a content of the polyester fibers can be 1 to 99 wt %. For example, the polyester fibers and the wool fibers are each present in an amount of 50 wt % in the fabric waste. A size of the fabric scrap can depend on subsequent processing conditions. For example, the fabric scrap can have a size of 3 cm (length)×3 cm (width). The above description is for exemplary purposes only and is not intended to limit the scope of the present disclosure.

Figure 2:
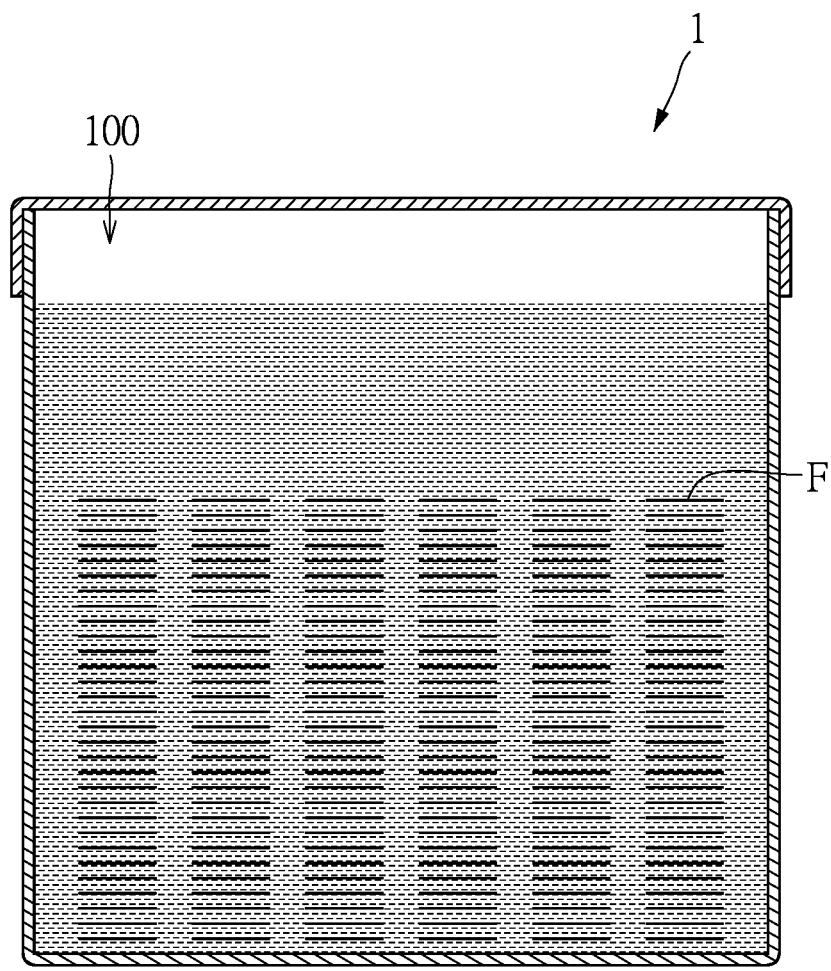
FIG. 2 is a schematic view of an apparatus used for the method for processing a waste fabric containing polyester and wool fibers according to the first embodiment of the present disclosure.

Reference is made to FIG. 2. In an implementation of step S102, the waste fabric (or fabric scraps) are dipped in the acid catalyst aqueous solution to form a solid-liquid coexistence mixed system, and a hydrothermal reaction is carried out at 160° C. to 170° C. for 1 hour to 5 hours. Accordingly, the wool fibers of the waste fabric (or fabric scraps) are degraded and dissolved out, but the polyester fibers do not undergo any changes in property. In order to efficiently separate the polyester fibers from the wool fibers, the waste fabric (or fabric scraps) can be uniformly dispersed in the acid catalyst aqueous solution, and can be reacted with the acid catalyst aqueous solution in a solid to liquid ratio of 1:5-100, in which a reaction temperature is controlled at 160° C. to 170° C. It is worth mentioning that the entire treatment process of the waste fabric uses water as a solvent, and is more environmentally friendly.

In practice, as shown in FIG. 2, a mixed system of the fabric scraps F and the acid catalyst aqueous solution is placed in a closed high pressure reactor 1, and a temperature in the high pressure reactor 1 is raised to 130° C. to 170° C. at a temperature rising rate of 5° C./min and maintained for 1 hour to 5 hours. The above description is for exemplary purposes only and is not intended to limit the scope of the present disclosure.

In the present embodiment, the acid catalyst aqueous solution includes at least one acid catalyst and water. The at least one acid catalyst can be an organic acid, an organic acid anhydride, a Lewis acid, or any combination thereof. Based on 100 wt % of the acid catalyst aqueous solution, a content of the at least one acid catalyst can be from 0.1 wt % to 10 wt %, and preferably from 4 wt % to 5 wt %. It should be noted that, although a higher content of the at least one acid catalyst can cause an increase in degradation speed of the wool fibers of the waste fabric (or fabric scraps) so that a reaction time is shortened, it also causes an increase in cost and a waste of the at least one acid catalyst.

Specific examples of the organic acid include methanesulfonic acid, oxalic acid, tartaric acid, citric acid, malic acid, formic acid, and acetic acid. The organic acid is preferably oxalic acid. Specific examples of the organic acid anhydride include acetic anhydride, propionic anhydride, butyric anhydride, valeric anhydride, lauric anhydride, palmitic anhydride, stearic anhydride, malonic anhydride, succinic anhydride, glutaric anhydride, adipic anhydride, acrylic anhydride, cinnamic anhydride, phthalic anhydride, acetic benzoic anhydride, amino acid anhydride, and derivatives thereof. The organic acid anhydride is preferably acetic anhydride. Specific examples of the Lewis acid include boron trichloride, zinc chloride, and zinc tetrafluoroborate. The Lewis acid is preferably zinc chloride. However, such examples are not intended to limit the present disclosure. In certain embodiments, the at least one acid catalyst is the combination of oxalic acid and acetic anhydride in a weight ratio of 1-10:1, thereby achieving better environmental and economic benefits.

In practice, a new acid catalyst aqueous solution can be supplied during the treatment process of the waste fabric (or fabric scraps), so as to maintain a concentration of the acid catalyst in a reaction system within a desired concentration range. The concentration of the acid catalyst varies depending on a pH value of the reaction system. More specifically, the pH value of the reaction system can be measured manually or automatically measured by a pH meter. The new acid catalyst aqueous solution can be directed into the high pressure reactor 1 when the pH value of the reaction system is greater than 4.

Reference is made to FIG. 2. In another implementation of step S102, the acid catalyst aqueous solution is applied in a circulation and backflow manner to repeatedly contact the waste fabric (or fabric scraps) and carry out a hydrothermal reaction at 160° C. to 170° C. for 1 hour to 5 hours. Accordingly, the wool fibers of the waste fabric (or fabric scraps) are degraded and dissolved out, but the polyester fibers do not undergo any changes in property. In order to efficiently separate the polyester fibers from the wool fibers, a contact frequency of the acid catalyst aqueous solution with the waste fabric (or fabric scraps) is controlled to be 3 to 5 times per minute, and a reaction temperature is controlled at 160° C. to 170° C. It is worth mentioning that, by virtue of the above implementation, the waste fabric (or fabric scraps) can be reacted with the acid catalyst aqueous solution in a solid to liquid ratio of 1:5-10, such that an amount of the acid catalyst aqueous solution can be greatly reduced so as to reduce costs, and a reaction time can be shortened. Furthermore, the entire treatment process of the waste fabric that uses water as a solvent is more environmentally friendly.

Figure 4:
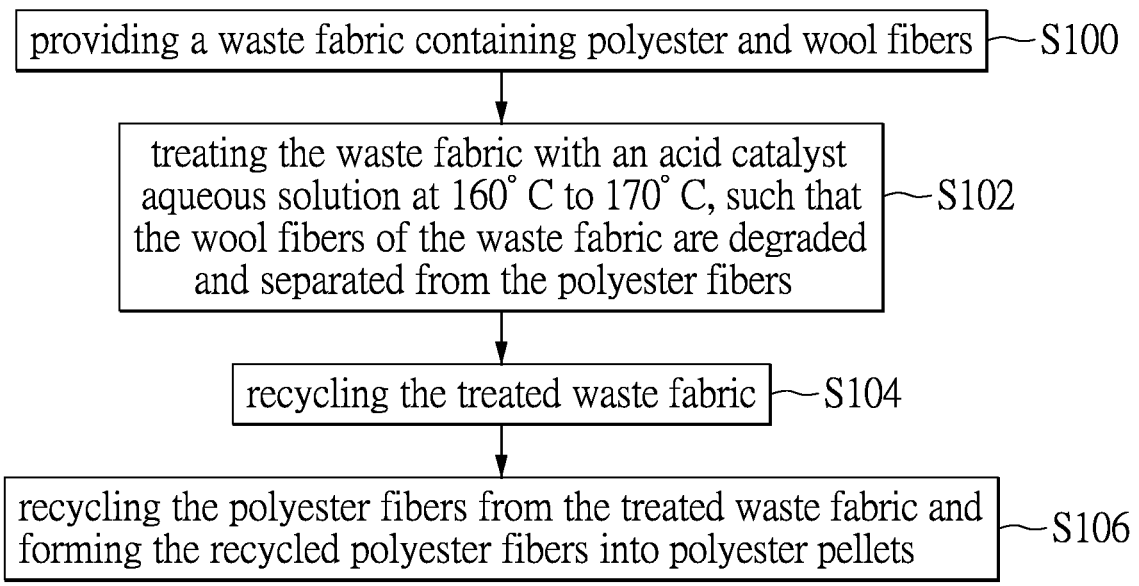
FIG. 4 is a schematic view of another apparatus used for the method for processing a waste fabric containing polyester and wool fibers according to the second embodiment of the present disclosure.

Reference is made to FIG. 4, which is a schematic view of an apparatus used for the method for processing the waste fabric containing the polyester and wool fibers of the present disclosure. The apparatus can allow the acid catalyst aqueous solution to repeatedly contact the waste fabric (or fabric scraps) in a circulation and backflow manner. As shown in FIG. 4, the apparatus can include a high pressure reactor 1 and a liquid storage tank 2. The high pressure reactor 1 can have a closed environment 100 formed therein and at least one porous tube 11 disposed in the closed environment 100. The porous tube 11 is in communication with the liquid storage tank 2 via a circulation pipeline 3 connected with a circulation pump P. In use, the fabric scraps F can be placed in the closed environment 100 by a suitable carrier such as a bracket or a hanging frame (not shown in FIG. 4), and the acid catalyst aqueous solution can be circulated between the high pressure reactor 1 and the liquid storage tank 2 through the circulation pipeline 3 to repeatedly contact and react with the fabric scraps F. Accordingly, the wool fibers are dissolved out of the fabric scraps F to form a keratin solution. More specifically, the acid catalyst aqueous solution can be sprayed out from the porous tube 11 to come into uniform contact with the fabric scraps F. Furthermore, an excess of the acid catalyst aqueous solution can be directed into an upstream section 31 of the circulation pipeline 3 from the bottom of the high pressure reactor 1, and then be directed into the liquid storage tank 2. Afterwards, the acid catalyst aqueous solution can be transferred to the porous tube 11 to be sprayed again through a downstream section 32 of the circulation pipeline 3. The entire process can be fully automated.

In step S104, the treated waste fabric (or fabric scraps) can be recycled by filtering. Therefore, the polyester fibers can be separated from the wool fibers, and the recycling and reuse of the polyester fibers can be achieved.

Second Embodiment

Figure 3:
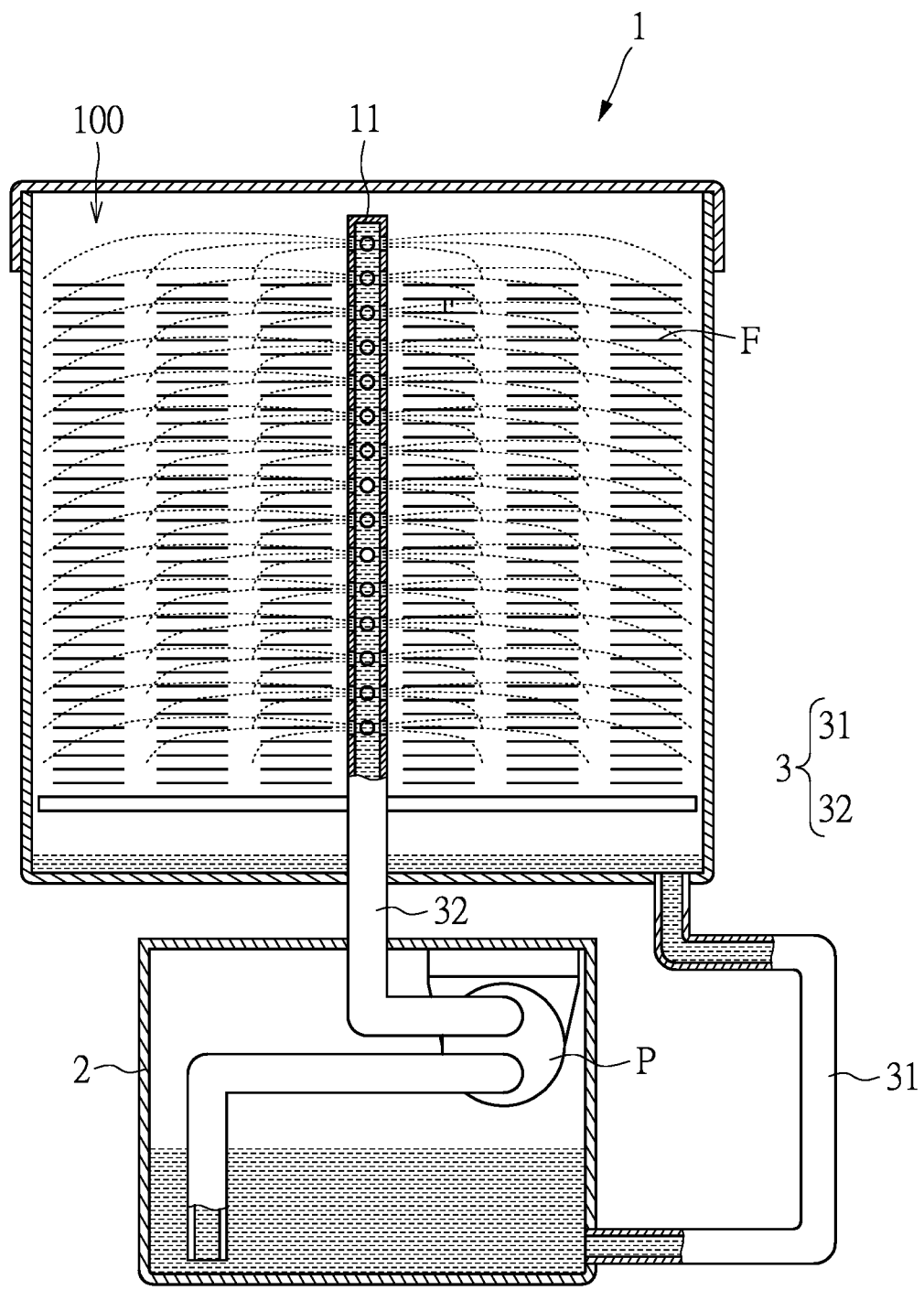
FIG. 3 is a flowchart of a method for processing a waste fabric containing polyester and wool fibers according to a second embodiment of the present disclosure.

Referring to FIG. 3, a second embodiment of the present disclosure provides a method for processing a waste fabric containing polyester and wool fibers, which mainly includes: step S100, providing a waste fabric containing polyester and wool fibers; step S102, treating the waste fabric with an acid catalyst aqueous solution at 160° C. to 170° C., such that the wool fibers of the waste fabric are degraded and separated from the polyester fibers; and step S104, recycling the treated waste fabric. The implementation details of step S100 to step S104 are described in the first embodiment and will not be reiterated herein. The main difference between the second embodiment and the first embodiment is that in the second embodiment, the method further includes: step S106, recycling the polyester fibers from the treated waste fabric and forming the recycled polyester fibers into polyester pellets.

In step S106, a physical or chemical regeneration process can be performed on the treated waste fabric (or fabric scraps), in which the polyester fibers are depolymerized and the resulting monomers and/or oligomers are repolymerized and formed into recycled polyester pellets (r-PET). It can be revealed from a relevant analysis that a recycle rate of the monomers and/or oligomers can reach more than 95%, which is not mixed with any wool fibers.

More specifically, in the physical regeneration process, the treated waste fabric (or fabric scraps) are melted and extruded to form pellets by an extruder. In the chemical regeneration process, a chemical depolymerizing solution is used to depolymerize the polyester fibers of the waste fabric (or fabric scraps), and the resulting monomers and/or oligomers are repolymerized under specific conditions and subsequently formed into pellets. The chemical depolymerizing solution can be water, methanol, ethanol, ethylene glycol, diethylene glycol, or any combination thereof, but is not limited thereto.

The present disclosure will be further described below in conjunction with specific examples.

Specific Example 1

A shirt having a polyester/wool blend ratio of 60/40 is divided into a plurality of fabric scraps each having a size of 3 cm (length)×3 cm (width). The fabric scraps are dispersed in an acid catalyst aqueous solution that includes 0.5% of oxalic acid to form a mixed system. The mixed system is placed in a closed reactor, and a heater is turned on to allow an internal temperature of the reactor to reach 160° C. for reaction for 3 hours.

The heater is turned off after completion of the reaction, a reaction product is taken out from the reactor after the internal temperature of the reactor is cooled down to room temperature. A filtration membrane made of polytetrafluoroethylene and having a pore diameter of 0.45 µm is used to filter out polyester fibers in the reaction product. After being washed, the polyester fibers are dried to constant weight in an oven at 110° C. It is found from an analysis result that the recycle rate of the polyester fibers is 96%.

Specific Example 2

A pants having a polyester/wool blend ratio of 60/40 is divided into a plurality of fabric scraps each having a size of 3 cm (length)×3 cm (width). The fabric scraps are dispersed in an acid catalyst aqueous solution that includes 0.5% of acetic anhydride to form a mixed system. The mixed system is placed in a closed reactor, and a heater is turned on to allow an internal temperature of the reactor to reach 160° C. for reaction for 3 hours.

The heater is turned off after completion of the reaction, and a reaction product is taken out from the reactor after the internal temperature of the reactor is cooled down to room temperature. A filtration membrane made of polytetrafluoroethylene and having a pore diameter of 0.45 µm is used to filter out polyester fibers in the reaction product. After being washed, the polyester fibers are dried to constant weight in an oven at 110° C. It is found from an analysis result that the recycle rate of the polyester fibers is 97%.

Specific Example 3

A pants having a polyester/wool blend ratio of 50/50 is divided into a plurality of fabric scraps each having a size of 3 cm (length)×3 cm (width). The fabric scraps are dispersed in an acid catalyst aqueous solution that includes 0.5% of phosphoric acid to form a mixed system. The mixed system is placed in a closed reactor, and a heater is turned on to allow an internal temperature of the reactor to reach 170° C. for reaction for 3 hours.

The heater is turned off after completion of the reaction, and a reaction product is taken out from the reactor after the internal temperature of the reactor is cooled down to room temperature. A filtration membrane made of polytetrafluoroethylene and having a pore diameter of 0.45 µm is used to filter out polyester fibers in the reaction product. After being washed, the polyester fibers are dried to constant weight in an oven at 110° C. It is found from an analysis result that the recycle rate of the polyester fibers is 95%.

Specific Example 4

A pants having a polyester/wool blend ratio of 30/70 is divided into a plurality of fabric scraps each having a size of 3 cm (length)×3 cm (width). The fabric scraps are dispersed in an acid catalyst aqueous solution that includes 0.5% of zinc chloride to form a mixed system. The mixed system is placed in a closed reactor, and a heater is turned on to allow an internal temperature of the reactor to reach 170° C. for reaction for 3 hours.

The heater is turned off after completion of the reaction, and a reaction product is taken out from the reactor after the internal temperature of the reactor is cooled down to room temperature. A filtration membrane made of polytetrafluoroethylene and having a pore diameter of 0.45 µm is used to filter out polyester fibers in the reaction product. After being washed, the polyester fibers are dried to constant weight in an oven at 110° C. It is found from an analysis result that the recycle rate of the polyester fibers is 96%.

Beneficial Effects of the Embodiments

In conclusion, the method for processing a waste fabric containing polyester and wool fibers provided by the present disclosure, by virtue of "treating the waste fabric with an acid catalyst aqueous solution at 160° C. to 170° C., such that the wool fibers of the waste fabric are degraded and separated from the polyester fibers," can separate the polyester fibers from the wool fibers and achieve the recycling and reuse of the polyester fibers. Moreover, the entire treatment process of the waste fabric that uses water as a solvent is more environmentally friendly.

Furthermore, the acid catalyst aqueous solution is applied in a circulation and backflow manner to repeatedly contact the waste fabric (or fabric scraps), such that a solid to liquid ratio of a reaction system can be lowered to 1:5-10. Accordingly, an amount of the acid catalyst aqueous solution can be greatly reduced, processing costs can be reduced, and a reaction time can be shortened.

In addition, the method for processing a waste fabric containing polyester and wool fibers of the present disclosure can help to achieve the recycling of textile resources, have significant economic benefits, and meet the requirements of industrialized production.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a waste fabric containing polyester and wool fibers, comprising:
   providing a waste fabric containing polyester and wool fibers and fragmentizing the waste fabric into a plurality of fabric scraps;
   treating the waste fabric with an acid catalyst aqueous solution, wherein the acid catalyst aqueous solution is applied in a circulation and backflow manner to repeatedly contact the fabric scraps and carry out a hydrothermal reaction at 160° C. to 170° C. for 1 hour to 5 hours, such that the wool fibers are degraded and separated from the polyester fibers, and wherein a contact frequency of the acid catalyst aqueous solution with the fabric scraps is 3 to 5 times per minute; and
   recycling the treated waste fabric.

2. The method according to claim 1, wherein in the step of treating the waste fabric with the acid catalyst aqueous solution, a solid-to-liquid weight ratio of the waste fabric and the acid catalyst aqueous solution is 1:5-100.

3. The method according to claim 2, wherein the solid-to-liquid weight ratio of the waste fabric and the acid catalyst aqueous solution is 1:5-10.

4. The method according to claim 2, wherein the acid catalyst aqueous solution includes 0.1 wt % to 1 wt % of at least one acid catalyst.

5. The method according to claim 4, wherein the at least one acid catalyst is an organic acid, an organic acid anhydride, a Lewis acid, or any combination thereof.

6. The method according to claim 5, wherein the organic acid is oxalic acid, the organic acid anhydride is acetic anhydride, and the Lewis acid is zinc chloride.

7. The method according to claim 6, wherein the at least one acid catalyst is the combination of oxalic acid and acetic anhydride, and the oxalic acid and the acetic anhydride are present in a weight ratio of 1-10:1.

8. The method according to claim 1, further comprising: recycling the polyester fibers from the treated waste fabric and forming the recycled polyester fibers into polyester pellets.

* * * * *